United States Patent
Yeo et al.

(10) Patent No.: US 7,431,489 B2
(45) Date of Patent: Oct. 7, 2008

(54) ENHANCED LIGHT FIXTURE

(75) Inventors: Terence E. Yeo, Boston, MA (US); Zane A. Coleman, Chicago, IL (US)

(73) Assignee: Fusion Optix Inc., Cambridge, MA (US)

( * ) Notice: Subject to any disclaimer, the term of this patent is extended or adjusted under 35 U.S.C. 154(b) by 65 days.

(21) Appl. No.: 11/282,551

(22) Filed: Nov. 17, 2005

(65) Prior Publication Data
US 2006/0227546 A1    Oct. 12, 2006

Related U.S. Application Data

(60) Provisional application No. 60/628,852, filed on Nov. 17, 2004.

(51) Int. Cl.
*F21V 7/04* (2006.01)
(52) U.S. Cl. .................. 362/606; 362/610; 362/615; 362/607; 362/616
(58) Field of Classification Search .......... 362/606, 362/607, 609, 610, 614, 613, 617, 618, 620, 362/632, 615, 616; 349/62, 63, 65
See application file for complete search history.

(56) References Cited

U.S. PATENT DOCUMENTS

| | | | | |
|---|---|---|---|---|
| 5,845,035 | A * | 12/1998 | Wimberger-Friedl | 385/129 |
| 6,020,944 | A * | 2/2000 | Hoshi | 349/62 |
| 6,750,996 | B2 * | 6/2004 | Jagt et al. | 359/34 |
| 2001/0030860 | A1 * | 10/2001 | Kimura et al. | 362/31 |
| 2003/0002153 | A1 | 1/2003 | Hiraishi et al. | 359/452 |
| 2003/0011725 | A1 * | 1/2003 | Ohkawa et al. | 349/96 |
| 2003/0058386 | A1 * | 3/2003 | Bastiaansen et al. | 349/100 |
| 2005/0068759 | A1 * | 3/2005 | Takemoto et al. | 362/31 |
| 2005/0254259 | A1 * | 11/2005 | Yamashita et al. | 362/621 |
| 2006/0056196 | A1 * | 3/2006 | Masuda | 362/600 |
| 2006/0181903 | A1 * | 8/2006 | Okuwaki | 362/619 |

OTHER PUBLICATIONS

Patent Abstracts of Japan, vol. 2000, No. 26, Jul. 1, 2002 & JP 2001 249205 A (Keiwa Inc.), Sep. 14, 2001, Abstract.
Patent Abstracts of Japan, vol. 2003, No. 12, Dec. 5, 2003 & JP 2003 302629 A (Daicel Chem. Ind. Ltd.; Mitsubishi Electric Corp.) Oct. 24, 2003, Abstract.
International Search Report and the Written Opinion of the International Searching Authority, or the Declaration, for PCT/US2005/042053, mailed May 4, 2006.

* cited by examiner

*Primary Examiner*—Jacob Y Choi

(57) ABSTRACT

An enhanced light fixture containing a volumetric, anisotropic diffuser to control the spatial luminance uniformity and angular spread of light from the light fixture is disclosed. The anisotropic diffuser provides increased spatial luminance uniformity and efficient control over the illuminance such that power reductions, reduced cost or reduced size may be achieved. The anisotropic diffuser contains one or more regions of asymmetrically shaped light scattering particles. The spread of illumination of light from a light emitting source can be efficiently controlled by using a thin, low cost, volumetric, asymmetric diffuser to direct the light in the desired direction. This allows the reduction in number of light sources, a reduction in power requirements, or a more tailored illumination. When the anisotropic diffuser is used in combination with a waveguide to extract light, the light is efficiently coupled out of the waveguide in a thin, planar surface. This transmissive diffuser can be coupled to a reflecting element such that the resulting combination is a light reflecting element with a desired asymmetric light scattering profile.

30 Claims, 10 Drawing Sheets

ENHANCED LIGHT FIXTURE

RELATED APPLICATIONS

This application claims the benefit of priority under 35 U.S.C. 119(e) to copending U.S. Provisional Application No. 60/628,852, filed on Nov. 17, 2004, the entire contents of which is incorporated herein by reference.

FIELD OF THE INVENTION

The invention generally relates to light fixtures, luminaries, lamps or other light emitting devices capable of being used for illumination.

BACKGROUND OF THE INVENTION

Fluorescent light bulb based light fixtures are generally rectangular in shape due to the typical long cylindrical shape of the fluorescent bulbs. With the non-symmetric shape of the light fixtures (longer in one direction), the light exiting the fixture using symmetrically scattering diffusers does not typically produce a uniform light illumination.

Improvements in solid state light sources such as light emitting diodes (LEDs) are continuously increasing their efficacy with the luminous output per electrical watt approaching fluorescent sources. LEDs are essentially point light sources as opposed to the extended light sources of fluorescent bulbs. Thus, the light from an LED has the potential to be controlled more effectively, even when more than one LED is used. Additionally, with the move toward point light sources, the visible speckle contrast on the light fixture can increase. More than one diffusive element in the path within the light fixture can reduce this effect, but this technique has not been applied to light fixtures. In other applications when more than one diffuser is used to decrease speckle contrast, symmetric diffusers are typically used and these would inefficiently spread the light in a light fixture. As a result, more light is absorbed within the fixture due to backscatter and the forward scattered light can scatter inefficiently in undesirable directions. Thus, a method is needed to efficiently scatter light while reducing the speckle contrast.

Typical light fixtures used for home, office, outdoor or other lighted areas generally employ traditional diffusive elements or refractive elements to spread the light from the light source. In many situations, it is desired to spread the light from the light source asymmetrically, directing more light along a hallway or path for example. Traditional diffusive elements are surface relief or symmetrically scattering volumetric materials. Surface relief elements can scatter symmetrically or asymmetrically. For example, holographic surface relief diffusers such as those manufactured by Reflexite Inc. or brushed aluminum can be used to asymmetrically spread the light from a light source. Brushed aluminum surfaces are relatively expensive to manufacture compared to the other diffusing options and are not often used. Surface relief diffusers can scatter light asymmetrically, however, all surface relief diffusers have a significant amount of backscatter that can reduce optical efficiency. Additionally, asymmetric surface relief diffusers are typically costly to produce (sometimes requiring expensive holographic mastering and precision casting production techniques) and difficult to clean due to dirt or particles becoming trapped in the inherent holes or pits in the relief structure.

Symmetrically scattering volumetric materials are typically easy to clean but do not efficiently control the scattering of light. They can be free-standing, laminated or otherwise optically coupled to another element such as a substrate, a glass globe, or waveguide because they do not rely on the refractive index difference between the element and air to re-direct light.

Refractive elements are also often used to control the spread of light from a light fixture. These refractive elements can include prism structures, small or micro-lens structures, dimples, indentions or other curved or angled structures one or more surfaces of a film or substrate. The appearance of these structures can create small bright spots in the fixture that are aesthetically unpleasing. Often, the materials used are brittle, creating fragile elements that can break easily. Also, since the refractive elements inherently have at least one surface that is not planar, they are significantly thicker than volumetrically scattering diffusive elements. This can increase the fixture volume and the cost of the fixture. Also, the refractive elements are not easily cleaned due to their surface structure.

Typically, when symmetric or surface relief diffusion is used to scatter the light and make the spatial luminance more uniform, there is a significant trade-off between backscatter and luminance uniformity. Very high isotropic diffusion in the volume or surface will generate a significant amount of backscatter. A significant portion of this backscatter will be absorbed within the fixture such as due to residual absorption in the "white" regions and the light source that do not perfectly reflect the light. As a result, often the uniformity is reduced at the expense of keeping the illuminance high.

SUMMARY OF THE INVENTION

The present invention addresses the need for enhanced light fixtures that more efficiently control light spread, provide spatial luminance uniformity, have low cost production cost, have elements that are easy to clean, and have reduced speckle contrast. The invention relates to enhanced light fixtures containing a volumetric, anisotropic diffuser to control the spatial luminance uniformity and angular spread of light from the light fixture. The anisotropic diffuser provides increased spatial luminance uniformity and efficient control over the illuminance such that power reductions, reduced cost or reduced size may be achieved. The anisotropic diffuser contains one or more regions of asymmetrically shaped light scattering particles. The spread of illumination of light from a light emitting source is efficiently controlled by using a thin, low cost, volumetric, asymmetric diffuser to direct the light in the desired direction. This allows the reduction in number of light sources, a reduction in power requirements, or a more tailored illumination. When the anisotropic diffuser is used in combination with a waveguide to extract light, the light is efficiently coupled out of the waveguide in a thin, planar surface. This transmissive diffuser can be coupled to a reflecting element such that the resulting combination is a light reflecting element with a desired asymmetric light scattering profile that can be used to create an enhanced light fixture.

DETAILED DESCRIPTION OF THE INVENTION

Figure 1:
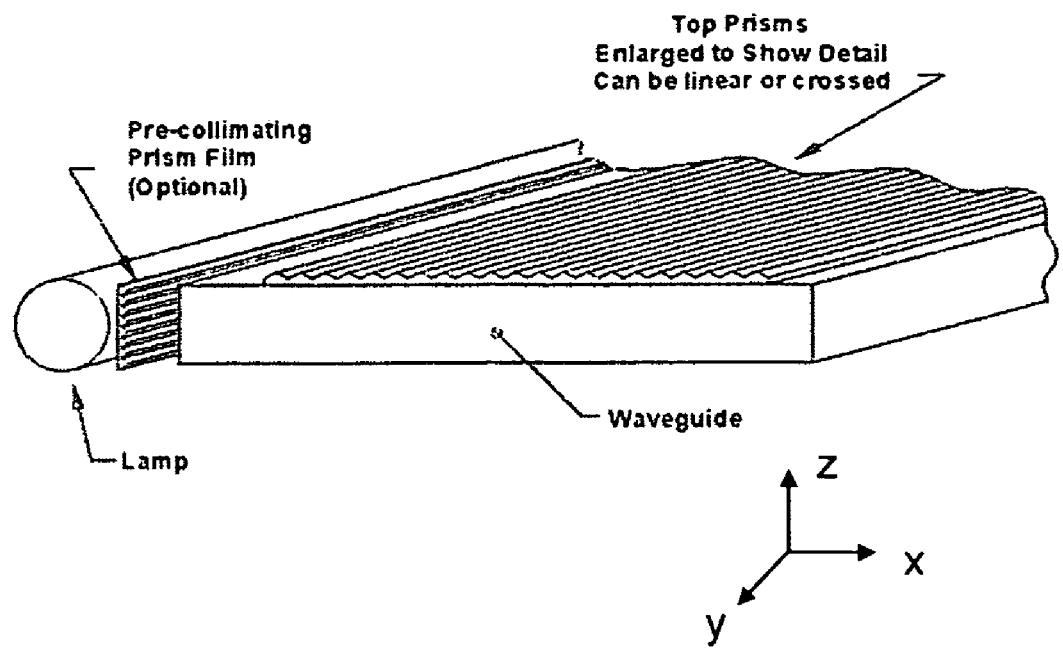
FIG. 1 is a perspective view of a prior art light fixture with a pre-collimating prism element used to increase coupling from a fluorescent bulb and a top prism element to couple light out of a waveguide.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Light fixture" is defined herein as the assembly that contains one or more light sources in a device used for illumination. It can contain electrical elements to provide power, control or other electrical based functions such as wires, sockets, switches, ballasts, connectors, circuitry, sensors. It can contain optical elements to direct or spread the light such as diffusers, prismatic elements, substrates, waveguides, reflectors, reflective elements, louvers, flutes, elevating prisms, depressing prisms, female prisms, scattering elements, diffusive housings, support elements and other housing elements which can include assembly components such as screws, clips, connectors, and protective elements and heat sinks. The term "Light fixture" includes luminaires, wall-washers, sconces, soffits, valances, coves, recessed fixture, torchiere, vanity lights, track-lights, pendants, under-cabinet lights, desk lamps, floor lamps, table lamps, street lamps, night lights, lamps, yard lights, path lights, flashlights, torches, and other similar and commomly used illumination devices. The light fixture may be multi-functional in that with minor changes it can serve multiple functions. For example, an LED in a mobile phone may be used as an illuminating flashlight, an autofocus flash for a built-in camera, and a flash for the digital photograph. In another example, the light fixture may provide illumination as well as provide information. For example, a dynamic sign (such as a digital sign with LEDs or with an LCD) or static display sign may provide information as well as illumination. The light fixture can provide functions in addition to illumination by adding additional elements such as fans, CD racks, security alarms, emergency lighting electronics, mirrors, emergency exit signs, entertainment or disco lights. A light fixture may contain other elements not specifically described herein that may be understood to those in the field to facilitate or enhance the illumination function or provide a specific function known to be achievable in combination with illumination.

"Speckle" includes scintillation or the optical interference pattern visible on a diffusing element.

"Speckle Contrast" is defined herein as the ratio of the standard deviation of the intensity fluctuation to the mean intensity over the area of interest.

"Diffuse" and "diffusing" as defined herein includes light scattering by reflection, refraction or diffraction from particles, surfaces, layers or regions.

"Optically coupled" is defined herein as condition wherein two regions or layers are coupled such that the intensity of light passing from one region to the other is not substantial reduced by Fresnel interfacial reflection losses due to differences in refractive indices between the regions. "Optical coupling" methods include methods of coupling wherein the two regions coupled together have similar refractive indices or using an optical adhesive with a refractive index substantially near or in-between the regions or layers. Examples of "Optical coupling" include lamination using an index-matched optical adhesive, coating a region or layer onto another region or layer, or hot lamination using applied pressure to join two or more layers or regions that have substantially close refractive indices. Thermal transfer is another method that can be used to optically couple two regions of material.

A "micro-body", "disperse phase domain," "gaseous void," "particle" as referred to herein are substantially small regions of material or blend of materials. They also include gaseous or void regions defined by the absence of a solid material. The optical effects of light reflecting from, absorbing or passing through these regions may vary and the method of manufacturing these micro-bodies can effect the resulting material and optical characteristics. Methods of manufacturing these types of micro-bodies are known in the art and include, but are not limited to, dispersing materials in a matrix and extruding the blend into a film, blending the micro-bodies within an extruder and extruding a film, injection molding a blend of materials, stretching a blend in conditions where a region is in the solid state such that a void is created, photopolymerization and monomer diffusion.

A "spherical" or "symmetric" disperse phase domain includes gaseous voids, micro-bodies, or particles that substantially resemble a sphere. A spherical domain may contain surface incongruities and irregularities but has a generally circular cross-section in substantially all directions. A "spheroid" is a type of ellipsoid wherein two of the three axes are equal. An "asymmetric" domain is referred to here as an "ellipsoidal" domain wherein each of the three axis can be a different length. Typically, ellipsoidal domains resemble squashed or stretched spheres. "Non-spherical" domains include ellipsoidal domains and other domains defined by shapes that do not resemble a sphere such as those that not have constant radii. For example, a non-spherical particle may have finger-like extensions within one plane (amoeba-like) and substantially planar in a perpendicular plane. Also, fibrous domains are also non-spherical disperse phase domains that may have aspect ratios of 10:1, 100:1 or larger.

"Light guide" or "waveguide" refers to a region bounded by the condition that light rays traveling at an angle that is larger than the critical angle will reflect and remain within the region. In a light guide, the light will reflect or TIR (totally internally reflect) if the angle ($\alpha$) does not satisfy the condition $$\alpha < \sin^{-1}\left(\frac{n_2}{n_1}\right)$$

where $n_1$ is the refractive index of the medium inside the light guide and $n_2$ is the refractive index of the medium outside the light guide. Typically, $n_2$ is air with a refractive index of n≈1, however, high and low refractive index materials can be used to achieve light guide regions. The light guide may comprise reflective components such as reflective films, aluminized coatings, surface relief features, and other components that can re-direct or reflect light. The light guide may also contain non-scattering regions such as substrates. Light can be incident on a light guide region from the sides or below and surface relief features or light scattering domains, phases or elements within the region can direct light into larger angles such that it totally internally reflects or into smaller angles such that the light escapes the light guide. The light guide does not need to be optically coupled to all of its components to be considered as a light guide. Light may enter from any face (or interfacial refractive index boundary) of the waveguide region and may totally internally reflect from the same or another refractive index interfacial boundary. A region can be functional as a waveguide for purposes illustrated herein as long as the thickness is larger than the wavelength of light of interest. For example, a light guide may be a 5 micron region with 2 micron×3 micron ellipsoidal dispersed particles or it may be a 3 millimeter diffuser plate with 2.5 micron×70 micron dispersed phase particles.

FIG. 1 is a perspective view of a prior art light fixture using prisms on one surface of a waveguide and prismatic films to increase coupling into a waveguide. Dust and dirt can collect on the prisms and they can be difficult to clean. Also, the thickness of the prisms adds to the volume of the light fixture.

Figure 2:
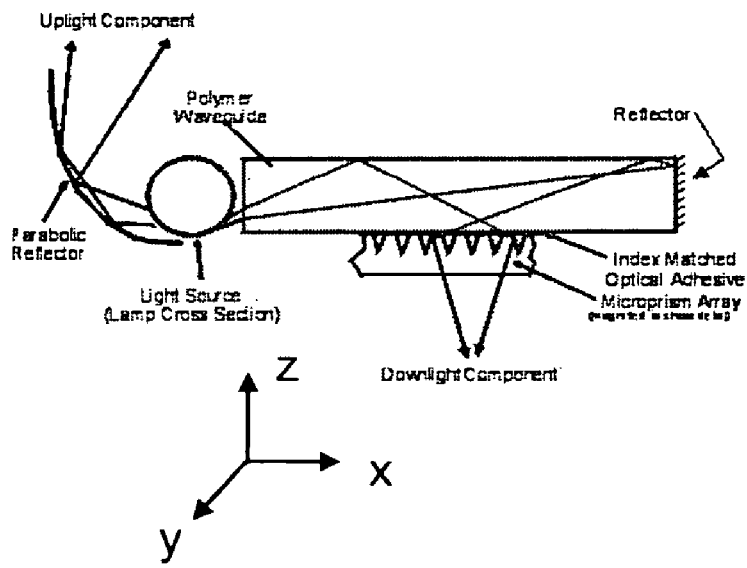
FIG. 2 is a schematic cross-sectional view of a prior art light fixture with a reflector to provide up-lighting and a microprism array to provide down-lighting.

FIG. 2 is a schematic cross-sectional side view a prior art of a light fixture providing direct and indirect illumination. In this light fixture, the prism structure (microprism array) is optically coupled to the waveguide. The prism structure adds to the thickness, thus volume of the light fixture and the complexity of optically coupling the prisms to the waveguide adds to the cost. If the ends are not sealed, then dust or dirt contamination will be very difficult to clean. Sealing the edges also adds to the cost.

Figure 3:
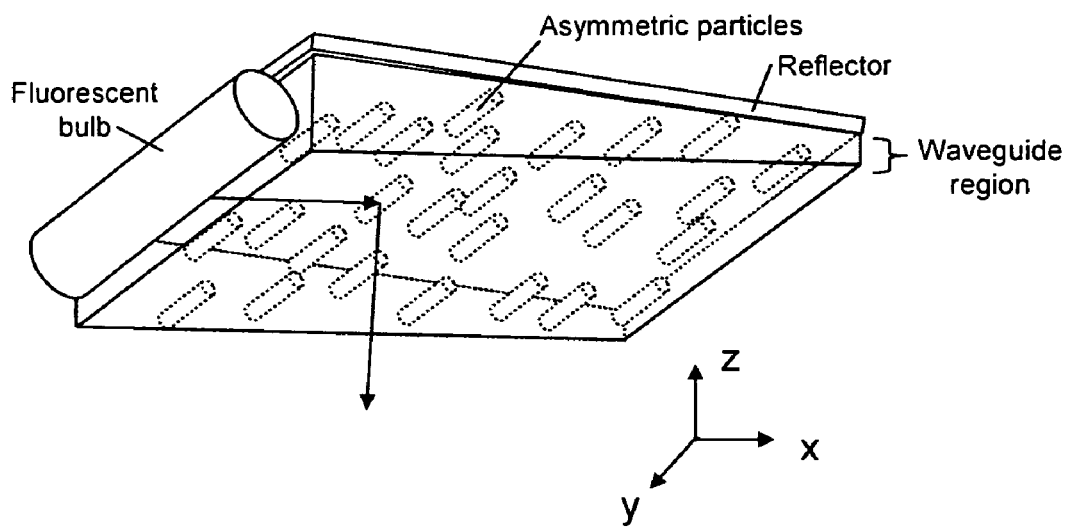
FIG. 3 is a perspective view of an enhanced light fixture containing a fluorescent bulb, a reflector and a tapered waveguide with asymmetric particles aligned parallel to the bulb.

FIG. 3 is a perspective view of an enhanced light fixture wherein the waveguide of the light fixture is a volumetric, anisotropic diffuser that scatters light out of one of its faces. The asymmetric particles in the volumetric, anisotropic scattering waveguide are oriented in the y direction and are parallel to the linear fluorescent bulb. Light scattering from the asymmetric particles will be substantially directed in the x and z directions. The light that is scattered in the +z direction can reflect off of the reflector and can escape the waveguide. A portion of the light that is scattered in the −z direction will directly be coupled out of the waveguide. The volumetric diffuse waveguide has a lower level of backscatter than a surface relief structure. Additionally, an anisotropic scattering waveguide has less backscatter than an isotropic scattering waveguide where the higher scattering is in both axes. Thus, a volumetric, anisotropic scattering waveguide results in less light directed back toward the bulb where it can be lost, creating a more efficient system. A more efficient system can enable cost reductions, thickness reductions, electrical power reductions, lower power light sources, etc. As shown in FIG. 3, there is less scatter in the y direction due to the asymmetry in the particles. Thus, less light is scattered toward the sides where it could escape or be directed back into the waveguide at an angle that could ultimately cause the light to be directed back toward the source and be absorbed. Since the light bulb is a substantially linear source aligned in the y direction, one does not need to scatter light the y direction. More than one light source at one or more edges may also be used. One or more of the sides or light sources may utilize a reflector to increase efficiency. The concentration, alignment or shape or size of the particles or dispersed phase domains may vary spatially (in one or more of the x, y, or z directions) in order to achieve a more uniform spatial luminance. Other light scattering (isotropic or anisotropic) or refracting elements could be optically coupled to or positioned near the exit surface to provide additional directing or scattering of the light.

Figure 4:
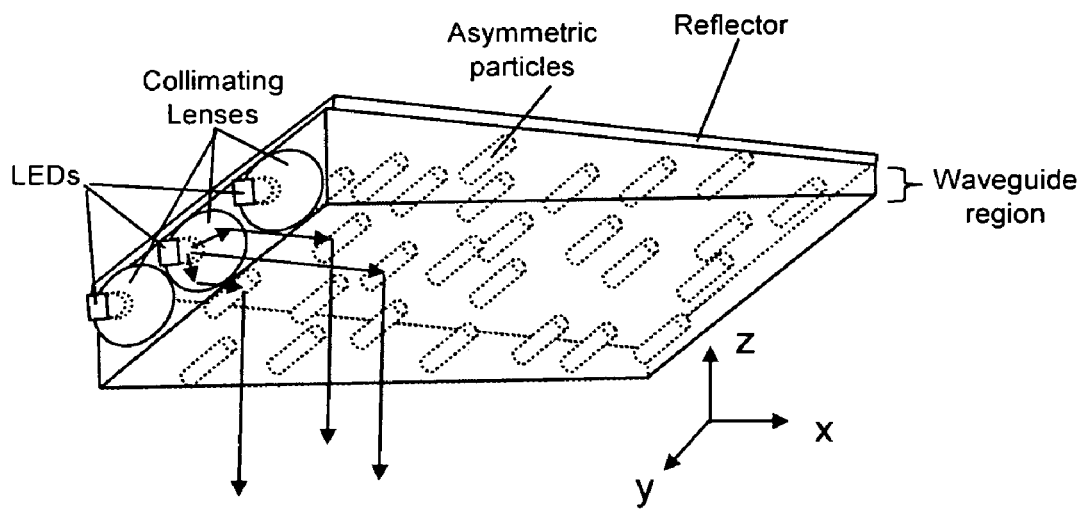
FIG. 4 is a perspective view of an enhanced light fixture containing a three LEDs with collimators, a reflector and a tapered waveguide with asymmetric particles aligned parallel to the linear array of LEDs.

FIG. 4 is a perspective view of an enhanced light fixture wherein the waveguide of the light fixture is volumetric and anisotropic scattering wherein it scatters light out of one of its faces of the waveguide. The asymmetric particles in the volumetric, anisotropic scattering waveguide are oriented in the y direction. The light from three LEDs is substantially collimated by lenses and coupled into the waveguide through one edge. Light from the LEDs is scattered from the asymmetric particles into the x and z directions. The light that is scattered in the +z direction can reflect off of the reflector and escape the waveguide. The light that is scattered in the −z direction can be directly coupled out of the waveguide. The volumetric diffuse waveguide will have a low level of backscatter thus less light is directed toward back toward the light source where it could be absorbed. There is less scatter in the y direction due to the asymmetry in the particles. Scattering in the y direction is not needed due to the substantially collimated line of light from the LEDs. As a result, less light is scattered toward the sides where it could escape or be directed back into the waveguide at an angle that could ultimately cause the light to be directed back toward the source and be absorbed. One or more of the sides and light sources may have a reflector to increase efficiency. Other scattering (isotropic or anisotropic) or refracting elements could be optically coupled to or positioned near the exit surface to provide additional directing or scattering of the light.

Figure 5:
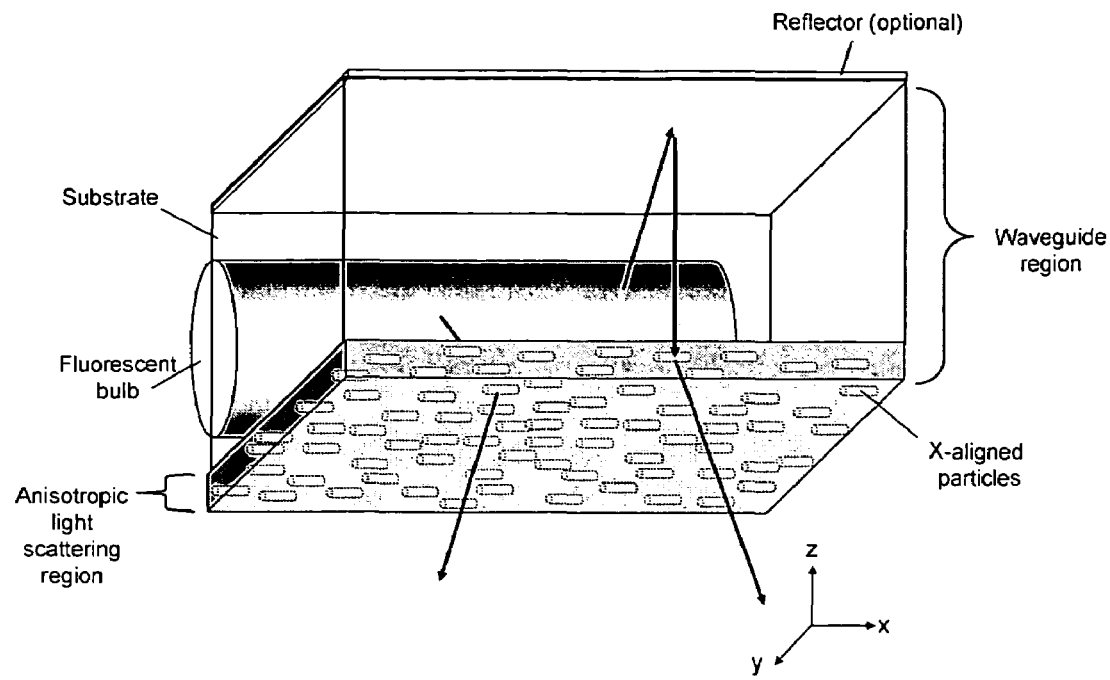
FIG. 5 is a perspective view of an enhanced light fixture containing a linear fluorescent bulb, a reflector optically coupled to a waveguide and an asymmetric film on the opposite face of the waveguide with the asymmetric particles aligned parallel to the bulb.

FIG. 5 is a perspective view of an enhanced light fixture wherein a volumetric, asymmetrically scattering region is optically coupled to the waveguide of a light fixture. The asymmetric particles in the scattering region are oriented in the x direction. The light from the fluorescent bulb is coupled into the waveguide through one edge. Light from the fluorescent bulb is reflected by the reflector and totally internally reflects within the light scattering region when the waveguide condition is satisfied. Light that is scattered from the asymmetric particles can be coupled out of the waveguide into the −z and y directions. Most of the light that is scattered in the +z direction will reflect off of the reflector and ultimately escape the waveguide in the −z direction. The light that is scattered in the −z direction will directly be coupled out of the waveguide if the waveguide condition is not satisfied. The volumetric anisotropic light scattering region has a low level of backscatter, thus less light is directed toward back toward the light source where it could be absorbed. There is less scatter in the x direction due to the asymmetry in the particles. As a result, less light is scattered toward the sides where it could escape or be directed back into the waveguide at an angle that could ultimately cause the light to be directed back toward the source and be absorbed. More than one light source may be used to increase the brightness or uniformity. One or more of the sides and light sources may have a reflector to increase efficiency. Other scattering (isotropic or anisotropic) or refracting elements could be optically coupled to or positioned near the exit surface to provide additional directing or scattering of the light.

Figure 6:
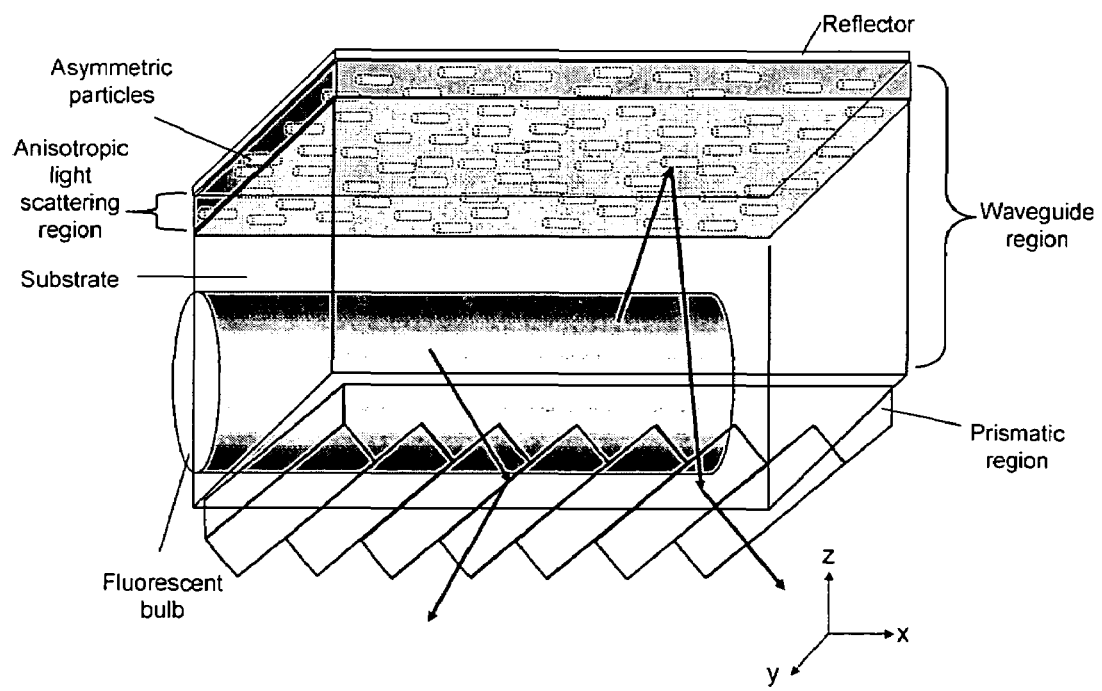
FIG. 6 is a perspective view of an enhanced light fixture containing a linear fluorescent bulb, a reflector and a light scattering region optically coupled to the top of a waveguide with the asymmetric particles aligned parallel to the bulb. A prism refracting element is added beneath the waveguide to spread the light in the direction orthogonal to the fluorescent bulb.

FIG. 6 is a perspective view of another embodiment of an enhanced light fixture wherein a volumetric, anisotropic scattering region is optically coupled to a waveguide and a reflector in a light fixture. The asymmetric particles in the scattering region are oriented in the x direction. The light from the fluorescent bulb is coupled into the waveguide through one edge. Light from the fluorescent bulb is reflected by the reflector and totally internally reflects within the waveguide when the waveguide condition is satisfied. Light that is scattered from the asymmetric particles can be coupled out of the waveguide into the −z and y directions. The light that is scattered in the +z direction can reflect off of the reflector back into the −z direction where it can be scattered again, escape the waveguide, or reflect off a reflector or other surface if the waveguide condition is satisfied. A portion of the light that is scattered in the −z direction will directly be coupled out of the waveguide. A light re-directing region contains a collimating feature of prismatic surface relief structures beneath the waveguide and may be optically coupled or have an air gap. The prismatic region can further spread the light out into desired directions based on the prism geometry. As shown, the prismatic structure will spread the light exiting the waveguide in the x direction. The volumetric light scattering region has a low level of backscatter, thus less light is directed toward back toward the light source where it could be absorbed. There is less scatter in the x direction due to the asymmetry in the particles. As a result, less light is scattered toward the sides where it could escape or be directed back into the waveguide at an angle that could ultimately cause the light to be directed back toward the source and be absorbed. More than one light source may be used and the light can be coupled into more than one edge of the waveguide. One or more of the sides or light sources may utilize a reflector to increase efficiency. Other scattering (isotropic or anisotropic) elements could be optically coupled to or positioned near the prismatic region to provide additional scattering of the light.

Figure 7:
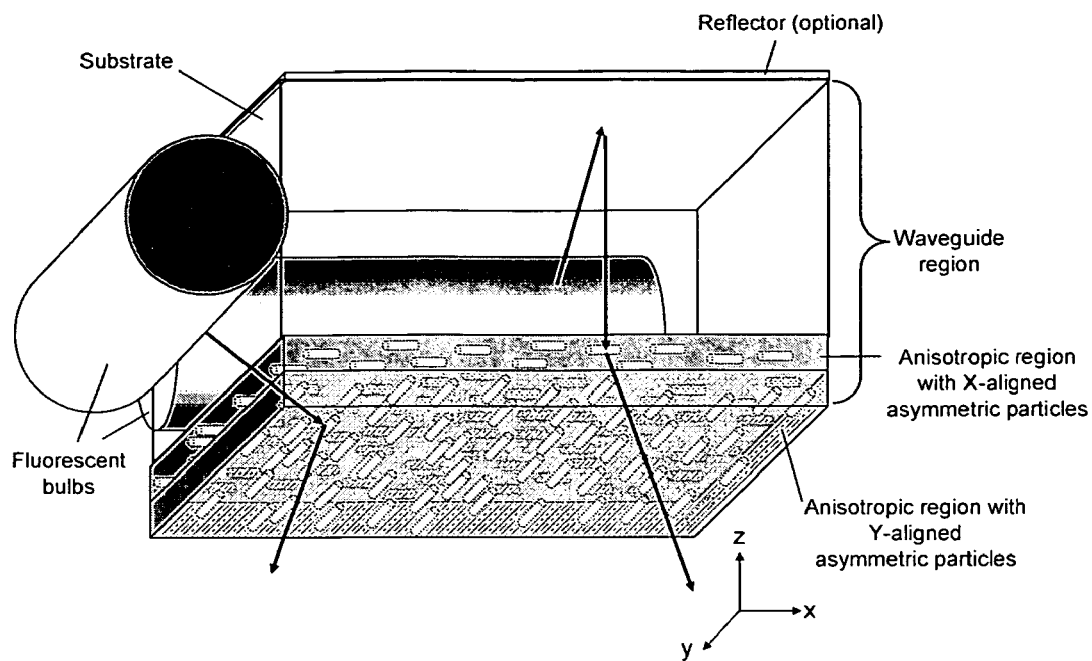
FIG. 7 is a perspective view of an enhanced light fixture containing two orthogonal linear fluorescent bulbs, a reflector optically coupled to the top of a waveguide, and two light scattering regions optically coupled to the bottom of a waveguide. The two light scattering regions are aligned substantially orthogonal to each other.

FIG. 7 is a perspective view of a further embodiment of an enhanced light fixture wherein two volumetric, anisotropic scattering regions are optically coupled to a waveguide. The asymmetric particles in the upper scattering region are oriented in the x direction. The asymmetric particles in the lower scattering region are oriented in the y direction. Light from two fluorescent bulbs is coupled into the waveguide through two orthogonal edges. Light from the fluorescent bulb is reflected by the reflector and totally internally reflects within the lower light scattering region when the waveguide condition is satisfied. Light that is scattered from the asymmetric particles located in the upper region can be coupled out of the waveguide into the −z and y directions. Light that is scattered from the asymmetric particles located in the lower region can be coupled out of the waveguide into the −z and x directions. The light that is scattered in the +z direction can reflect off of the reflector back into the −z direction where it can be scattered again, escape the waveguide, or reflect off a reflector or other surface if the waveguide condition is satisfied. By using two volumetric, asymmetrically scattering regions, the angular distribution of the light from the light fixture can be controlled independently and efficiently. The light from the fluorescent bulb aligned in the y direction is scattered efficiently into the −z direction by the asymmetric particles that are aligned in the y direction. Similarly, the light from the fluorescent bulb aligned in the x direction is scattered efficiently into the −z direction by the asymmetric particles that are aligned in the x direction. One or more of the sides or light sources may utilize a reflector to increase optical efficiency. Other scattering (isotropic or anisotropic) or refractive elements could be optically coupled to or positioned near the lower light scattering region to provide additional re-direction or scattering of the light.

Figure 8:
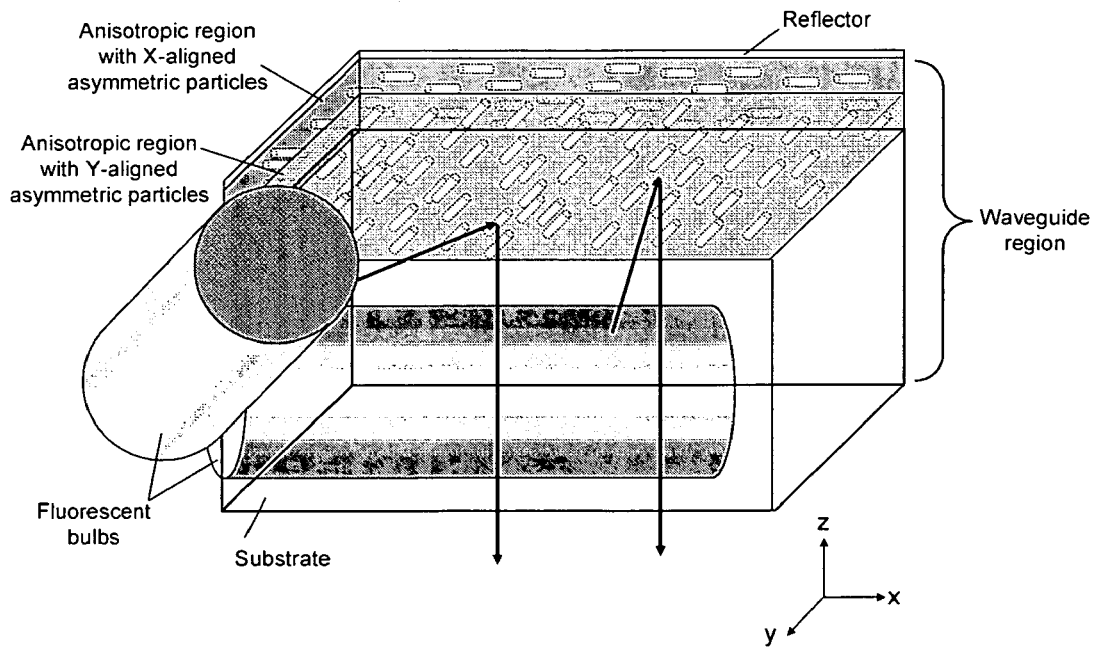
FIG. 8 is a perspective view of an enhanced light fixture containing two linear fluorescent bulbs, two orthogonally aligned asymmetrically scattering regions optically coupled to the top of a waveguide, and a reflector optically coupled to the top light scattering region.

FIG. 8 is a perspective view of another embodiment of an enhanced light fixture wherein two volumetric, asymmetrically scattering regions are optically coupled to a reflector and a waveguide. The asymmetric particles in the upper scattering region are oriented in the x direction. The asymmetric particles in the lower scattering region are oriented in the y direction. Light from two fluorescent bulbs is coupled into the waveguide through two orthogonal edges. Light from the fluorescent bulb is scattered by one or more of the light scattering regions and either escapes the waveguide, is reflected by the reflector or totally internally reflects within the waveguide when the waveguide condition is satisfied. By using two volumetric, asymmetrically scattering regions, the angular distribution of the light from the light fixture can be controlled independently and efficiently. The sides and light source may have a reflector to increase efficiency. More than two asymmetrically scattering regions may be used and they may be separated by substantially non-scattering regions. Other scattering (isotropic or anisotropic) or refractive elements could be optically coupled to or positioned near the lower light scattering region to provide additional re-direction or scattering of the light.

Figure 9:
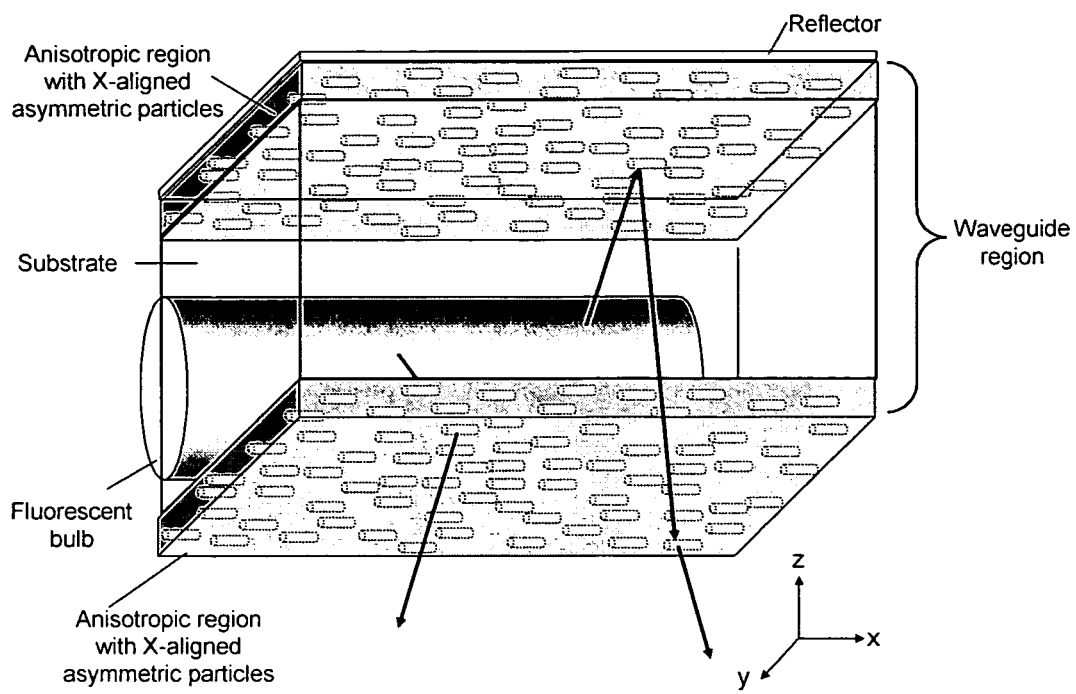
FIG. 9 is a perspective view of an enhanced light fixture containing a linear fluorescent bulb, two light scattering regions optically coupled to the top and bottom of a waveguide containing asymmetric particles aligned parallel to each other and a reflector optically coupled to the top of a waveguide.

FIG. 9 is a perspective view of an embodiment of an enhanced light fixture wherein a non-scattering substrate is optically coupled to and between two volumetric, anisotropic scattering regions. The upper and lower scattering regions contain asymmetric particles oriented in the x direction. In one embodiment, the waveguide is substantially defined by the region between the reflector and the lower light scattering region. Light from a fluorescent bulb aligned in the x direction is coupled into the waveguide through an edge. Light from the fluorescent bulb is scattered by one or more of the light scattering regions and either escapes the waveguide, is reflected by the reflector or totally internally reflects within the waveguide when the waveguide condition is satisfied. By using two volumetric, anisotropic scattering regions with particles aligned parallel to the fluorescent bulb, light can efficiently be scattered out of the waveguide with little backscatter. Additionally, the spacing between the light scattering regions can reduce the speckle contrast. The spatial luminance uniformity is improved due to the angular spread of the light in the non-uniform direction and the second localized diffusion. One or both of the anisotropic scattering regions may scatter light in both directions, with a higher degree of scattering in one direction. As a result, the distribution of the light from the light fixture can be controlled in the x and y directions. One or more of the sides or light sources may utilize a reflector to increase efficiency. Other scattering (isotropic or anisotropic) or refractive elements could be optically coupled to or positioned near the lower light scattering region to provide additional re-direction or scattering of the light.

Figure 10:
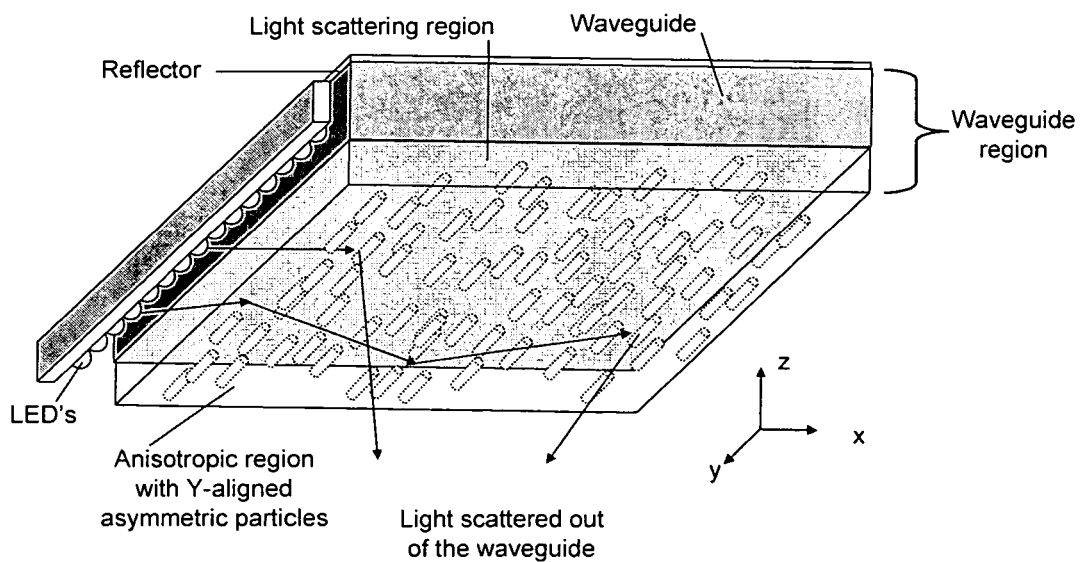
FIG. 10 is a perspective view of an enhanced light fixture containing a linear array of LEDs, a reflector optically coupled to a waveguide and a light scattering region on the opposite face of the waveguide containing asymmetric particles aligned parallel to the linear array of LEDs.

FIG. 10 is a perspective view of an enhanced light fixture wherein a volumetric, asymmetrically scattering region is optically coupled to the waveguide of a light fixture that utilizes LEDs as the light source. The asymmetric particles in the scattering region are oriented in the y direction and the linear array of LEDs is aligned in the y direction. The light from the LEDs is coupled into the waveguide through one edge. Light from the LEDs is reflected by the reflector and totally internally reflects within the light scattering region when the waveguide condition is satisfied. A portion of the light that is scattered from the asymmetric particles is coupled out of the waveguide into the −z and x directions. The light that is scattered in the +z direction will reflect off the reflector and be directed in the −z direction. A portion of the light that is scattered in the −z direction will directly be coupled out of the waveguide if the waveguide condition is not satisfied. The volumetric light scattering region has low level of backscatter, thus less light is directed toward back toward the light source where it could be absorbed. There is less scatter in the y direction due to the asymmetry in the particles. As a result, less light is scattered toward the sides where it could escape or be directed back into the waveguide at an angle that could ultimately cause the light to be directed back toward the source and be absorbed. More than one array of LEDs may be used in two or more edges. The arrays may be of predominantly one color (white for example) or they may be of multiple colors (red, green, and blue for example). In the cases where the LEDs are not of the same color, increased color uniformity may be achieved by the use of one or more anisotropic light scattering regions. In a one embodiment, an anisotropic light scattering region is disposed in a light transmitting region located between one or more of the light sources and an input surface of a region capable of supporting a waveguide. Single LED sources may also be used depending on the desired brightness and size of the fixture. Arrays of light sources other than LEDs may be used. More than one array of light sources may be utilized to increase the brightness or uniformity. One or more of the sides and light sources may utilize a reflector to increase efficiency. Other scattering (isotropic or anisotropic) or refracting elements could be optically coupled to or positioned near the exit surface to provide additional directing or scattering of the light.

Figure 11:
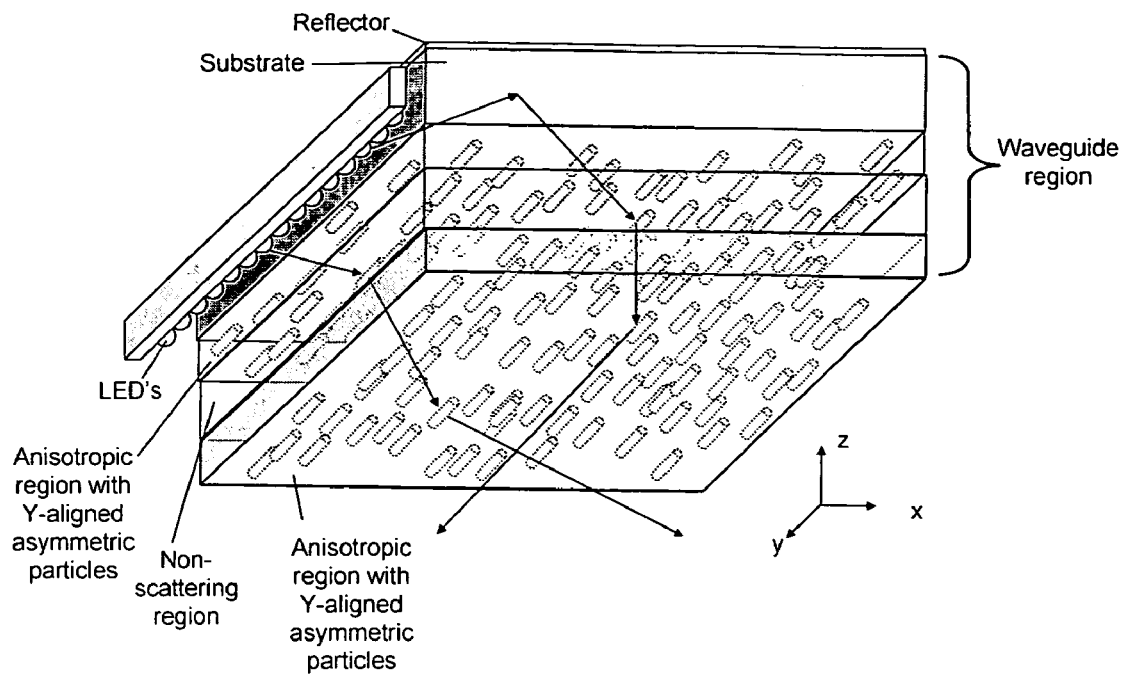
FIG. 11 is a perspective view of an enhanced light fixture containing a linear array of LEDs, a reflector optically coupled to a waveguide and a multi-region anisotropic diffuser on the opposite face of the waveguide containing asymmetric particles aligned parallel to the linear array of LEDs.

FIG. 11 is a perspective view of another enhanced light fixture wherein a diffuser containing two volumetric, asymmetrically scattering regions separated by a non-scattering region is optically coupled to the waveguide of a light fixture that utilizes LEDs as the light source. The asymmetric particles in the scattering region are oriented in the y direction and the linear array of LEDs is aligned in the y direction. The light from the LEDs is coupled into the waveguide through one edge. The light in the waveguide is reflected by the reflector and totally internally reflects within the light scattering region when the waveguide condition is satisfied. A portion of the light that is scattered from the asymmetric particles is coupled out of the waveguide into the −z and x directions. The light that is scattered in the +z direction can reflect off of the reflector and be re-directed into the −z direction. The light that is scattered in the −z direction will be coupled out of the waveguide if the waveguide condition is not satisfied. The volumetric light scattering region can have low level of backscatter, thus less light is directed toward back toward the light source where it could be absorbed. There is less scatter in the y direction due to the asymmetry in the particles. As a result, less light is scattered toward the sides where it could escape or be directed back into the waveguide at an angle that could ultimately cause the light to be directed back toward the source and be absorbed. By using a diffuser with multiple light scattering regions separated by a non-scattering region, the speckle contrast of the light fixture can be reduced while maintaining efficient control over the angular spread of light from the light fixture. An asymmetric light scattering diffuser can be used that has some scattering in the x and y directions in order to achieve a desired angular spread of light. More than one array of LEDs may be used in two or more edges. Single LED sources may also be used depending on the desired brightness and size of the fixture. Arrays of light sources other than LEDs may be used. More than one array of light sources may be utilized to increase the brightness or uniformity. One or more of the sides and light sources may utilize a reflector to increase efficiency. Other scattering (isotropic or anisotropic) or refracting elements could be optically coupled to or positioned near the exit surface to provide additional directing or scattering of the light.

Figure 12:
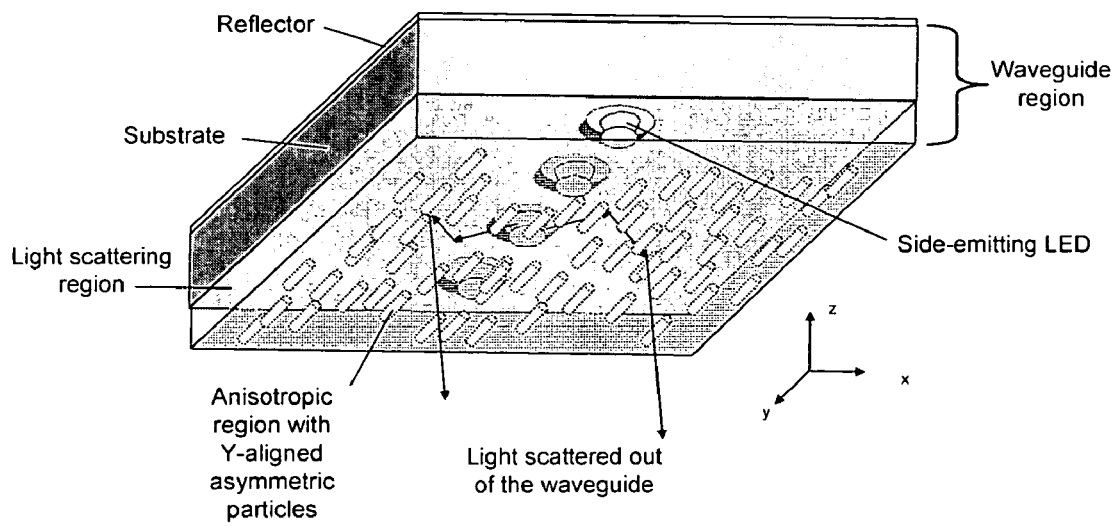
FIG. 12 is a perspective view of an enhanced light fixture containing a linear array of side-emitting LEDs, a reflector optically coupled to a waveguide and a light scattering region on the opposite face of the waveguide containing asymmetric particles aligned parallel to the linear array of LEDs.

FIG. 12 is a perspective view of an enhanced light fixture wherein a volumetric, anisotropic scattering region is optically coupled to the waveguide of a light fixture that utilizes side-emitting LEDs as the light source. The asymmetric particles in the scattering region are oriented in the y direction and the linear array of side-emitting LEDs is aligned in the y direction. The light from the LEDs is coupled into the waveguide through openings within the non-scattering substrate. As illustrated, the waveguide region is between the reflector and the top surface of the light scattering region. Light from the LEDs is reflected by the reflector and totally internally reflects within the light scattering region when the waveguide condition is satisfied. A portion of the light that is scattered from the asymmetric particles is coupled out of the waveguide into the −z and x directions. The light that is scattered in the +z direction will reflect off of the reflector and be directed into the −z direction. A portion of the light that is scattered in the −z direction will directly be coupled out of the waveguide if the waveguide condition is not satisfied. The volumetric light scattering region has a low level of backscatter, thus less light is directed toward back toward the light source where it could be absorbed. There is less scatter in the y direction due to the asymmetry in the particles. As a result, less light is scattered toward the sides where it could escape or be directed back into the waveguide at an angle that could ultimately cause the light to be directed back toward the source and be absorbed. One or more of the of the waveguide may utilize a reflector to increase efficiency. Other scattering (isotropic or anisotropic) or refracting elements could be optically coupled to or positioned near the exit surface to provide additional directing or scattering of the light. More than one array or pattern of LEDs may be used in different regions of the waveguide. Single LED sources may also be used depending on the desired brightness and size of the fixture. The waveguide may contain symmetric or asymmetric light scattering particles.

Figure 13:
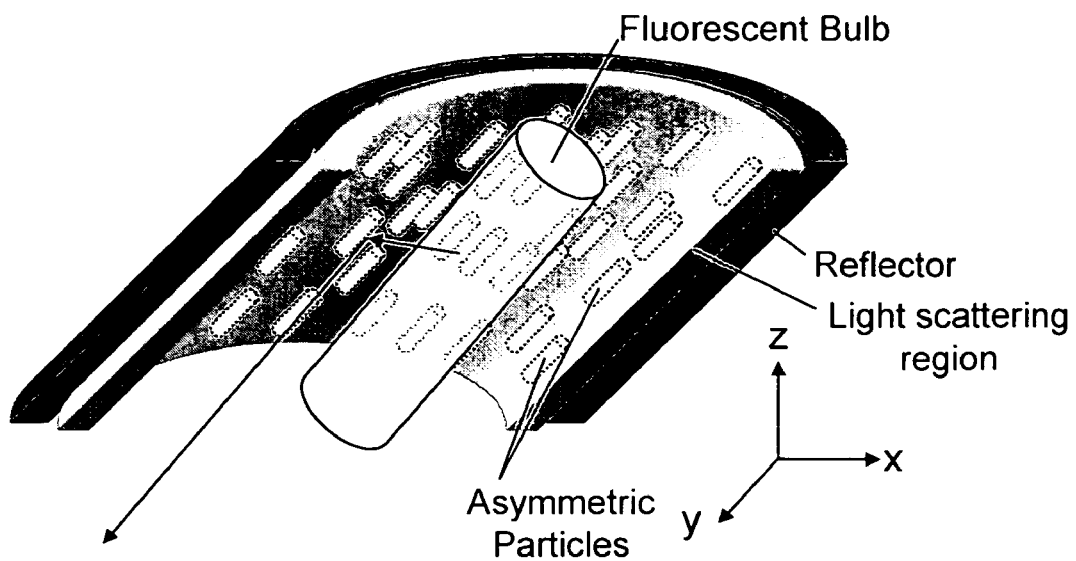
FIG. 13 is a perspective view of an enhanced light fixture containing a linear fluorescent bulb and a light scattering film optically coupled to the reflector for the bulb containing asymmetric particles aligned parallel to bulb.

FIG. 13 is a perspective view of an enhanced light fixture containing a fluorescent bulb wherein a volumetric, anisotropic scattering region is optically coupled to a reflector. The scattering region contains asymmetric particles aligned in the y direction. The fluorescent bulb is aligned in the y direction. Light from the fluorescent bulb is preferentially scattered in the x direction due to the asymmetric shape of the particles. Since the light source is substantially linear, less light scattering is needed along that linear direction. As a result, more efficient control of the angular distribution of light output from the light fixture can be achieved. More than one volumetric, anisotropic scattering region may be used. Other scattering (isotropic or anisotropic) or refracting elements could be positioned near the exit surface to provide additional directing or scattering of the light. The diffuser can be manufactured using low cost methods and can be very thin (reducing the volume of the light fixture) and making it easy to clean. A diffuser may be coated with a reflective coating to provide a diffusely reflective element. In one embodiment, the reflector is substantially planar such as the case where an anisotropic scattering film is laminated using pressure sensitive adhesive to an aluminum housing, or an anisotropic scattering film is vacuum deposition coated with aluminum on one side to achieve a high level of reflectivity.

Figure 14:
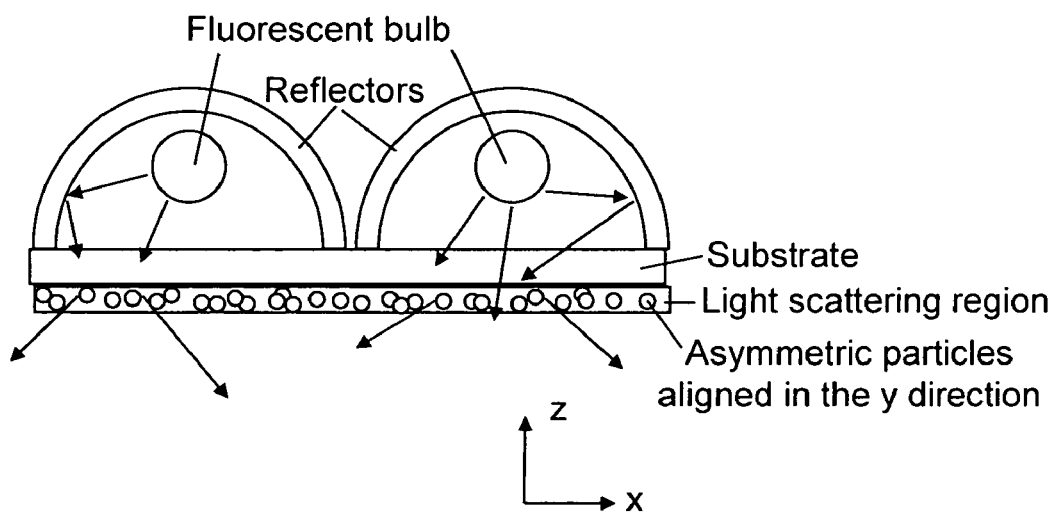
FIG. 14 is a schematic cross-sectional view of an enhanced light fixture containing two linear fluorescent bulbs, their reflectors, and a light scattering region beneath the bulbs containing asymmetric particles aligned parallel to bulbs.

FIG. 14 is a perspective view of an enhanced light fixture containing fluorescent bulbs and a volumetric, anisotropic scattering diffuser. The diffuser contains asymmetric particles aligned in the y direction. The fluorescent bulbs are aligned in the y direction. Light from the fluorescent bulb is preferentially scattered in the x direction due to the asymmetric shape of the particles. As a result, more efficient control of the angular distribution of light output from the light fixture can be achieved.

In one embodiment, more than one anisotropic light scattering region may be used in a fluorescent light fixture wherein the scattering regions are separated by a substantially non-scattering region. The luminance uniformity is increased further in the case of multiple anisotropic light scattering regions because the light is scattered into steep angles by the first scattering region. Without a second light scattering region, the luminance, as seen by a viewer, would still have a "hot spot". However, by using the second asymmetric light scattering region, the light that was angularly distributed into higher angles is incident in regions further from the hot spot since it has traveled a distance through a non-scattering region. The second scattering region creates a second scattering surface wherein the spatial luminance is more uniform. In a preferred embodiment, the second light scattering region is anisotropic and is optically coupled to the non-scattering region.

More than one volumetric, anisotropic scattering region may be used. Other scattering (isotropic or anisotropic) or refracting elements could be positioned near the exit surface to provide additional directing or scattering of the light. The diffuser can be manufactured using low cost methods and can be very thin (reducing the volume of the light fixture) and making it easy to clean.

Figure 15:
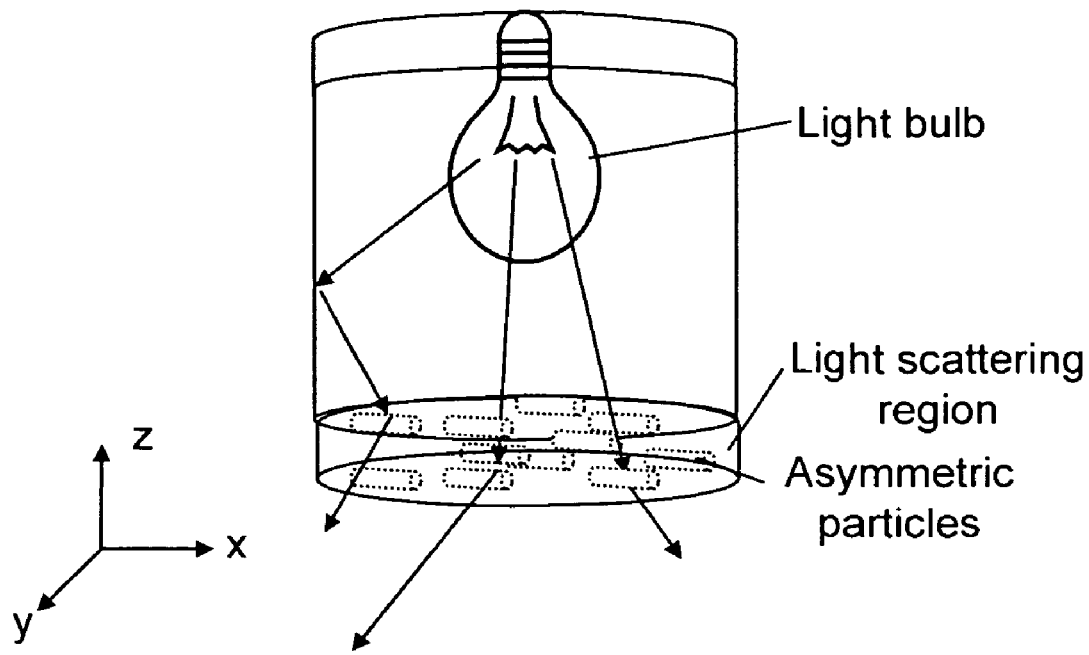
FIG. 15 is a schematic cross-sectional view of an enhanced light fixture containing an incandescent bulb in a can type reflective housing and a light scattering region beneath the bulb containing asymmetric particles.

FIG. 15 is a perspective view of an enhanced light fixture containing an incandescent bulb and a volumetric, anisotropic scattering diffuser. The can-shaped light fixture can provide a specific or changeable light scattering output. As shown, the diffuser contains asymmetric particles aligned in the x direction. Light from the bulb is preferentially scattered in the y direction due to the asymmetric shape of the particles. This can produce a desired light output profile such as preferentially lighting a long hallway that extends in the y direction. In a further embodiment, the light scattering diffuser could be rotated such that the light output could be aligned according to the user's preference. More than one diffuser could be used to provide additional control over the light output. Other scattering (isotropic or anisotropic) or refracting elements could be positioned near the exit surface to provide additional directing or scattering of the light. The diffuser can be manufactured using low cost methods and can be very thin (reducing the volume of the light fixture) and easy to clean.

Figure 16:
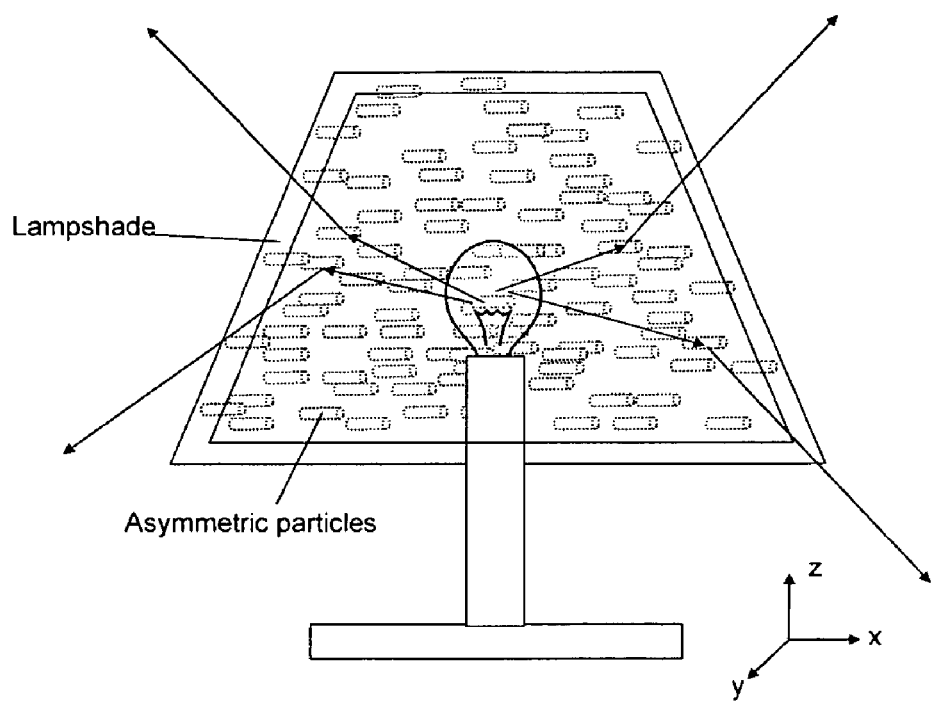
FIG. 16 is a schematic cross-sectional view of an enhanced light fixture containing an incandescent bulb in a lamp type housing and a light scattering region in the shade containing asymmetric particles.

FIG. 16 is a perspective view of an enhanced light fixture containing an incandescent bulb and a volumetric, anisotropic scattering diffuser. The table lamp light fixture can provide a specific or changeable light scattering output. The diagram shows a "slice" of the conical lamp shade. The diffuser contains asymmetric particles aligned along the circumference direction. Thus the particles are located in the x-y plane and rotate around the circumference from the x to the y directions. The concentration of particles can vary in one or more regions of the diffuser. Light from the bulb is preferentially scattered in the z direction due to the asymmetric shape of the particles. This can produce a desired light output profile such as preferentially lighting a region of a room. For example, the light could be preferentially scattered toward ceiling (or floor) to provide indirect lighting. In a further embodiment, the light scattering diffuser or lamp shade could be rotated such that the light output could be aligned according to the user's preference. More than one diffuser could be used to provide additional control over the light output. Other scattering (isotropic or anisotropic) or refracting elements could be positioned near the exit surface to provide additional directing or scattering of the light. The diffuser can be manufactured using low cost methods and can be very thin (reducing the volume of the light fixture) and easy to clean.

Figure 17:
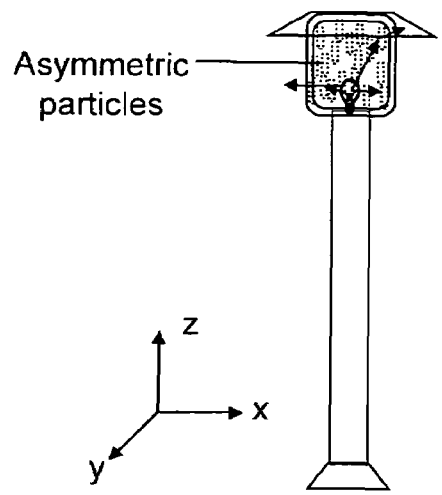
FIG. 17 is a schematic cross-sectional view of an enhanced light fixture containing an high pressure sodium bulb in a street light housing and a light scattering region containing asymmetric particles around the perimeter of the globe.

FIG. 17 is a perspective view of an enhanced light fixture containing an high-pressure sodium bulb and a volumetric, anisotropic scattering diffuser. The street lamp light fixture can be designed to efficiently scatter light to illuminate a desired region. As shown, the diffuser contains asymmetric particles aligned in the z direction. Light from the source is preferentially scattered in the x-y plane due to the asymmetric shape of the particles. This can produce a desired light output profile such as preferentially lighting an outdoor region. For example, the light could be preferentially scattered in the horizontal direction to light a pathway without directing a significant amount of light in a vertical direction that would be wasted and cause light pollution. More than one diffuser could be used to provide additional control over the light output. Other scattering (isotropic or anisotropic) or refracting elements could be positioned near the exit surface to provide additional directing or scattering of the light. The diffuser can be manufactured using low cost methods and can be very thin (reducing the volume of the light fixture) and easy to clean.

The fixture elements described herein can contain additional particles or materials to protect (hardcoats), reduce glare, diffuse light (symmetric or asymmetric particles), and provide other protective or optical enhancement such as those known to those in the lighting design field. The diffuser may be made using flexible or rigid materials and may be used with existing light fixtures or combined in a light fixture package or device.

The different variations in features and designs of the enhanced light fixture described herein can be envisioned and include one or more combinations of the features described below:

1. Number of scattering regions: one; two; more than two;
2. Scattering region:
   a. Scattering region location: within the waveguide; within a substrate; within a multi-region diffuser; between the reflective element and the waveguide; within a coating on a waveguide; within a film optically coupled to the waveguide; within an adhesive between two elements of a light fixture;
   b. Scattering region thickness: greater than 5 microns and less than 300 mm;
   c. Diffusing particle shapes: symmetric; or asymmetric particles; or a combination of both.
   d. Diffusing particles refractive index: average refractive index $n_p$ wherein $|n_p-n_m|>0.001$; refractive index $n_{px}$ and $n_{py}$, in the x and y directions respectively, wherein $|n_{px}-n_m|>0.001$; $|n_{py}-n_m|>0.001$; or $|n_{py}-n_m|>0.001$ and $|n_{px}-n_m|>0.001$.
   e. Separation between individual scattering regions: greater 5 microns and less than 300 mm.
   f. Asymmetric particle alignment: x direction; y direction; z direction; at an angle relative to the x, y, or z directions; static; adjustable; automatically aligned; varying spatially;
3. Reflector type: none; metallized coating; multi-layer reflective plastic; reflective metal;
4. Light source type: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source;
5. Number of light sources: one; two; more than two;
6. Individual light source color: primary color; non-primary color; white; cool white; warm white;
7. Light source optics: none, collimating lens; collimating reflector; integrator; refractive lens; reflective lens;
8. Light fixture type: directly lighting; indirectly lighting; both directly and indirectly lighting; shielded; task light; down light; architectural fixtures; edge-lit; back-lit; front-lit; combination of fixture types;
9. Waveguide material: none; polymer; rubber; plastic; glass;
10. Waveguide extraction method: symmetrically diffusing regions; asymmetrically diffusing regions; printed dots; prismatic shapes;
11. Prismatic shapes; regular array in x direction; regular array in the y direction; regular array in the x and y directions; irregular array; apex angle greater than 90 degrees; apex angle less than 90 degrees;
12. Bulb or tinted region color: none, primary color; non-primary color;
13. Tint location: None; within substrate; within light scattering region(s); within non-scattering region; a separate film or region;
14. Diffuser Substrate Type: None; rigid; flexible; substantially transparent; substantially opaque
15. Substrate location: none; behind the reflector; in-between the light scattering regions; in front of the light scattering regions;
16. Additional coatings or films: None; Anti-reflection; Anti-glare; Hardcoat; capping layers (protecting metal layers from oxidation or compounds with the adhesive or other components); adhesives; glues; reflective films; tinted films; protective films; graphic films; patterned films; decorative films;

Multi-region diffusers may have other different configurations and are described further in U.S. patent application Ser. No. 11/197,246, and the different configurations and embodiments disclosed are included as references and embodiments herein.

Preferred embodiments of the present invention are illustrated in the following Example(s). The following examples are given for the purpose of illustrating the invention, but not for limiting the scope or spirit of the invention.

EXAMPLE 1

An enhanced light fixture in accordance with the present invention can be produced as described in FIG. 5, that is designed to have increased optical efficiency, increased spatial luminance, be easy to clean, and low cost. This is possible because the volumetric anisotropic scattering film optically coupled to the waveguide more efficiently controls the light scattering. An anisotropic light scattering film is created with scattering particles in a host matrix material by extruding, casting or coating, the mixture containing particles. The particle chosen may be a polystyrene bead of diameter 5 µm dispersed at 10% concentration in a host matrix of acrylic. Other choices of particles and host matrix may provide equivalent performance and details of other methods for creating an anisotropic light scattering film suitable for use in a light fixture are illustrated in U.S. Pat. No. 5,932,342, the text of which is incorporated herein by reference. Asymmetry and alignment of the asymmetry can be created by stretching or extrusion processes. The resulting film containing asymmetric particles is optically coupled to a transparent acrylic waveguide by lamination using pressure sensitive adhesive (PSA). Aluminized Mylar from DuPont is laminated to the waveguide on the opposite face using PSA. A linear fluorescent bulb is aligned along one edge that is parallel to the alignment of the asymmetric particles. Further common fixture elements such as those to contain the light source, waveguide and the electronics and electrical elements of the fixture are attached to create an enhanced light fixture.

EXAMPLE 2

An enhanced light fixture in accordance with the present invention can be produced as described in FIG. 9, that is designed to have increased optical efficiency, reduced speckle contrast, be easy to clean, and low cost. This is possible because the multiple regions of asymmetrically scattering particles optically coupled to the waveguide more efficiently control the light scattering while reducing speckle contrast. A light diffusing film containing light scattering particles in a host matrix material is created by extruding, casting or coating, the mixture containing particles. The particle chosen may be a polystyrene bead of diameter 5 μm dispersed at 10% concentration in a host matrix of acrylic. Other choices of particles and host matrix can provide equivalent performance. Asymmetry and alignment of the asymmetry can be created by stretching or extrusion processes. A portion of the resulting film containing asymmetric particles is optically coupled to a transparent acrylic substrate by lamination using a PSA. Another portion of the film is optically coupled to the opposite face of the acrylic substrate wherein the particles are aligned substantially parallel to those in the other light scattering film. Aluminized Mylar from DuPont is laminated to one of the light scattering films using a PSA. A linear fluorescent bulb is aligned along one edge that is parallel to the alignment of the asymmetric particles. Further common fixture elements such as those to contain the light source, substrate and the electronics and electrical elements of the fixture are included to create an enhanced light fixture.

EXAMPLE 3

An enhanced light fixture in accordance with the present invention can be produced as described in FIG. 1, that is designed to have increased optical efficiency, reduced speckle contrast, be easy to clean, and low cost. This is possible because the multiple anisotropic light scattering regions optically coupled to a substrate, creating a waveguide with efficient light scattering, increased spatial luminance uniformity and reducing speckle contrast. A multi-region light diffusing film containing light scattering particles in a host matrix material is created by extruding, casting or coating, the mixture containing particles. A substantially non-scattering material is optically coupled in-between the light scattering regions. The particles chosen may be a polystyrene bead of diameter 5 μm dispersed at 10% concentration in a host matrix of acrylic. Other choices of particles and host matrix can provide equivalent performance. Asymmetry and alignment of the asymmetry can be created by stretching or extrusion processes. A portion of the resulting anisotropic light scattering film containing asymmetric particles is optically coupled to a transparent acrylic substrate by lamination using pressure sensitive adhesive, thus creating a waveguide. Aluminized Mylar from DuPont is laminated to the face opposite the scattering film using PSA. A linear array of LEDs such as LXHL-NW99 from Lumileds Lighting Inc. is aligned along one edge that is parallel to the alignment of the asymmetric particles. Further common fixture elements such as those to contain the light source, waveguide and the electronics and electrical elements of the fixture are included to create an enhanced light fixture.

EXAMPLE 4

Figure 18:
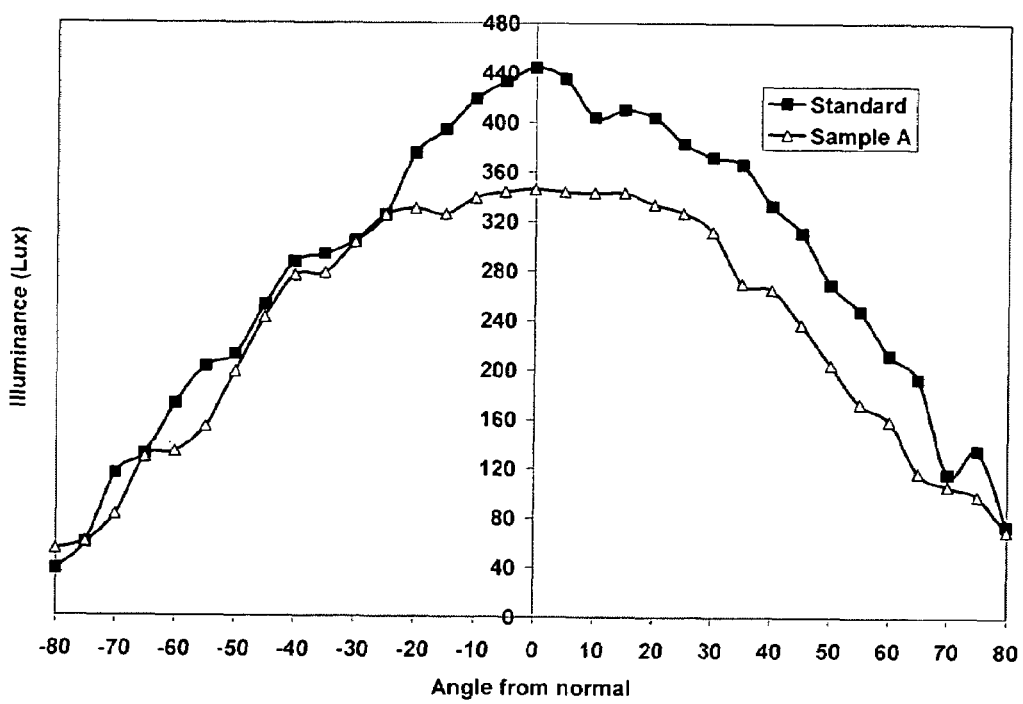
FIG. 18 is a graph of the angular illuminance distribution from measurements further detailed in Example 4.
Figure 19:
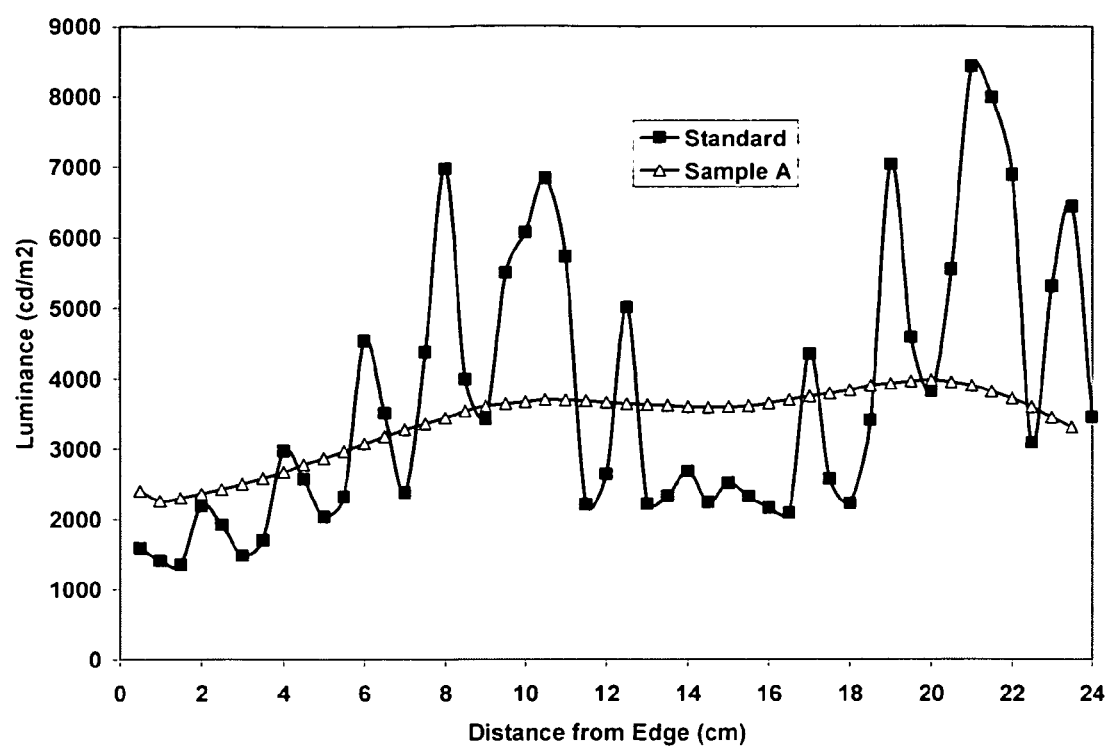
FIG. 19 is a graph of the spatial luminance uniformity from measurements further detailed in Example 4.

An enhanced light fixture, in accordance with the present invention, was produced as described in FIG. 14, that is designed to have increased spatial luminance uniformity, be easy to clean, and low cost while maintaining angular illuminance. This is possible because the volumetric asymmetric scattering film located beneath the lamps and reflectors more efficiently controls the light scattering. A light scattering film with anisotropic scattering profile was prepared by blending and extruding a mixture of 70% polyester and 30% polyethylene into a film and stretching the film to achieve asymmetric dispersed phase domains as described in U.S. Pat. No. 5,932,342. The resulting 200 micron film had a full-width half maximum angular luminance profile of 70°×10° upon illumination with collimated light. Sample A was prepared by optically coupling a sheet of the anisotropic light scattering film to the light source side of a 2 mm clear polycarbonate sheet such that the major diffusing axis was perpendicular to the linear fluorescent lamps in the light fixture. A Lithonia lighting two foot by eight foot T8 troffer fluorescent light fixture, model number 2GT8-432A12-12-1/4GEB was used to compare the effects of the anisotropic light scattering region. The standard sample used as a benchmark is the convex-concave prismatic sheet included with the fluorescent light fixture. The angular illuminance profile is measured in a plane perpendicular to the linear fluorescent bulbs at a location directly above a fluorescent bulb with a MS6610 digital lux meter from Kaito Electronics (Montclair, Calif.) at varying 5 degree angular positions. The standard sample and sample A were measured. The spatial luminance uniformity is measured at 0.5 cm intervals on either side of a region directly above the T8 fluorescent lamp in the light fixture with a Minolta CS-100 luminance and tristimulous spot meter. The results of the angular illuminance distribution are shown in FIG. 18 and the spatial luminance uniformity is shown in FIG. 19.

The angular illuminance distribution is calculated by looking at the angular width at the half peak illuminance points in the graph. The FWHM of the illuminance of the standard light fixture is 107 degrees while the FWHM of the illuminance with sample A is 108 degrees as measured from FIG. 18. Thus, the addition of the anisotropic light scattering element did not reduce the angular spread of light in the plane perpendicular to the fluorescent bulbs. The spatial luminance uniformity is calculated by looking at the difference between the maximum and the minimum luminance divided by the maximum luminance to result in a luminance contrast. Thus a lower luminance contrast signifies a higher uniformity. The luminance contrast of the standard light fixture take from data in FIG. 19 is 88% and the luminance contrast of sample A is 43%. Thus, the anisotropic light scattering region significantly increases the spatial luminance while maintaining the angular profile in the plane perpendicular to the fluorescent bulbs. Since the anisotropic scattering region is within the volume of a planar sheet, the fixture surfaces are easier to clean. The light fixture is also aesthetically attractive because it does not have hot spots or visible structures such as prisms on the surface.

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. Related applications to this are PCT/US05/31276, U.S. Patent Application Nos. 11/197,246, 11/223,660, and 60/628,852, the entire contents of which are incorporated herein by reference.

What is claimed is:

1. A light ficture comprising:
   a) at least one light emitting source;
   b) a light transmitting region comprising a first anisotropic scattering region comprising a first continuous phase material of refractive index $n_{c1}$ and a first dispersed phase material of refractive index $n_{d1}$ wherein $|n_{c1}-n_{d1}|>0.001$ and one or more of the first dispersed phase domains are ellipsoidal in shape disposed to receive light from the light emitting source and scatter light to provide illumination;
   c) a housing providing support for the source and light transmitting region; and
   d) a substantially planar first light output surface
wherein the first dispersed phase domains are arranged substantially parallel to the first light output surface and the anisotropic light scattering region scatters a predetermined first portion of light from the light emitting source toward the first light output surface and a second predetermined portion of light away from the first light output surface.

2. The light fixture of claim 1 wherein the light fixture emits light in a first light output profile when the anisotropic light scattering element is in a first orientaion and can be re-configured after installation to emit light in a second light output profile different than the first light output profile by rotating the anisotropic light scattering region to a second orientation.

3. The light fixture of claim 1 wherein the shapes of the first dispersed phase domains vary spatially in the anisotropic light scattering region.

4. The light fixture of claim 1 wherein the light fixture is a direct and indirect illumination type.

5. The light fixture of claim 4 wherein the spatial luminance uniformity of apparatus is greater than or equal to 70%.

6. The light fixture of claim 4 wherein the apparatus emits anisotropic light radiation.

7. The light fixture of claim 4 wherein the light source is selected from a group consisting of: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source.

8. The light fixture of claim 7 containing more than one light emitting source with the light emitting sources arranged in an array.

9. The light fixture of claim 8 wherein the cross-section profile of the light source is substantially longer in the x direction than the y direction.

10. The light fixture of claim 8 wherein the array is a linear array.

11. The light fixture of claim 4 further comprising a reflective element.

12. The light fixture of claim 4 wherein the first dispersed phase domains are gaseous.

13. The light fixture of claim 4 wherein the concentration of the first dispersed phase domains varies spatially in the fist anisotropic light scattering region.

14. The light fixture of claim 4 wherein the sizes of the first dispersed phase domains vary spatially in the first anisotropic light scattering region.

15. The light fixture of claim 4 wherein the orientation of the first dispersed phase domains varies spatially in the first anisotropic light scattering region.

16. The light fixture of claim 4 wherein the light transmitting region further comprises substantially spherical particles.

17. The light fixture of claim 4 wherein the light transmitting region further comprises a surface relief light re-directing feature.

18. The light fixture of claim 17 wherein the surface relief light re-directing feature is a collimating feature.

19. The light fixture of claim 18 wherein the surface relief light collimating feature is a linear array of prisms.

20. The light fixture of claim 18 wherein the surface relief light re-directing feature is an array of concave surface relief patterns on a light transmitting material.

21. The light fixture of claim 18, wherein the surface relief light re-directing feature is an array of convex surface relief patterns comprising a coating containing substantially spherical micro-bodies.

22. The light fixture of claim 17, wherein the surface relief light re-directing feature increases the full angular width at half maximum illuminance in at least one direction.

23. The light fixture of claim 1 wherein the light transmitting region further comprises a second anisotropic light scattering region disposed to receive light from the first anisotropic light scattering region and provide illumination comprising a second continuous phase material of refractive index $n_{c2}$ and a second dispersed phase material of refractive index $n_{d2}$ wherein $|n_{c2}-n_{d2}|>0.001$ and one or more of the second dispersed phase domains are ellipsidal in shape and oriented substantially orthogonal to the first disersed phase domains.

24. The light fixture of claim 23, wherein the first anisotropic light scattering region is separated from the second anisotropic light scattering region by a substantially non-scattering region.

25. The light fixture of claim 1 containing refractive materials with one or more refractive indexes selected from a group consisting of: $n_{dx1} \neq n_{dy1}$, $n_{dx1} \neq n_{dz1}$, $n_{dy1} \neq n_{dz1}$, $n_{cx1} \neq n_{cy1}$, $n_{cx1} \neq n_{cz1}$, $n_{cy1} \neq n_{cz1}$ where $n_{dx1}$, $n_{dy1}$, $n_{dz1}$ are refractive indexes of the dispersed phase material in the x, y, and z direction, respectively, and $n_{cx1}$, $n_{cy1}$, $n_{cz1}$ are the refractive indexed of the first continuous phase material in the x, y, and z directions, respectively and x, y, and z are three mutually orthogonal directions.

26. The light fixture of claim 1 further comprising a substantially non-scatterin light transmitting region of refractive index $n_t$ wherein a first set of light rays from the light emitting source totally internally reflects within the light tranmitting region.

27. The light fixture of claim 26, wherein the first anisotropic light scattering region is disposed such that one or more first dispersed phase domains scatters incident light into an angle θ such that $$\theta < \sin^{-1}\left(\frac{1}{n_{c1}}\right) \text{ or } \theta < \sin^{-1}\left(\frac{1}{n_t}\right).$$

28. The light fixture of claim 1 further comprising first surface normal to the first light output surface at angle α within the light transmitting region and a second light output surface with a second surface normal angle β within the light transmitting region wherein light exits the light fixture through the first and second surfaces to provide illumination wherein α≠β.

29. The light fixture of claim 28, wherein $0° \leq |\alpha - \beta| \leq 180°$.

30. The light fixture of claim 1 wherein the light fixture emits light in a first light output profile when the anisotrpic light scattering element is in a first position and can be reconfigured by the user of the light fixture to emit light in a second light output profile different than the first light output profile by translating the spatial position of the anisotropic light scattering region to a second position.

* * * * *